United States Patent [19]

Gentry

[11] Patent Number: 5,001,856
[45] Date of Patent: Mar. 26, 1991

[54] RATTLING FISHING LURE

[75] Inventor: Don Gentry, Williamson County, Ill.

[73] Assignee: Lunker Lure Products, Inc., Carterville, Ill.

[21] Appl. No.: 375,903

[22] Filed: Jul. 6, 1989

[51] Int. Cl.$^5$ .............................................. A01K 85/00
[52] U.S. Cl. .................................... 43/42.31; 43/42.37
[58] Field of Search ................ 43/42.31, 42.36, 42.37, 43/42.38, 42.39, 42.13

[56] References Cited

U.S. PATENT DOCUMENTS

| | | | |
|---|---|---|---|
| 2,910,800 | 11/1959 | Cicala | 43/42.37 |
| 3,066,434 | 12/1962 | Duller | 43/42.38 |
| 3,158,953 | 12/1964 | Filler | 43/42.39 |
| 3,802,115 | 4/1974 | Auten et al. | 43/42.31 |
| 3,831,307 | 8/1974 | Pittman | 43/42.31 |
| 3,848,353 | 11/1974 | McClellan | 43/42.31 |
| 3,935,660 | 2/1976 | Plew | 43/42.31 |
| 4,712,326 | 12/1987 | Hoover et al. | 43/42.31 |
| 4,747,228 | 5/1988 | Giovengo, Jr. | 43/42.31 |
| 4,791,750 | 12/1988 | Gammill | 43/42.31 |

Primary Examiner—Kurt Rowan
Assistant Examiner—James Miner
Attorney, Agent, or Firm—Kalish & Gilster

[57] ABSTRACT

A fishing lure has a rattling device comprising an elongated capsule of synthetic resin material containing noise-makers and having a cap which also serves to secure the capsule to the lure. The exterior of the capsule is exposed to the water in which the lure is immersed to optimally transmit noise from the rattle to the water for attracting fish.

33 Claims, 1 Drawing Sheet

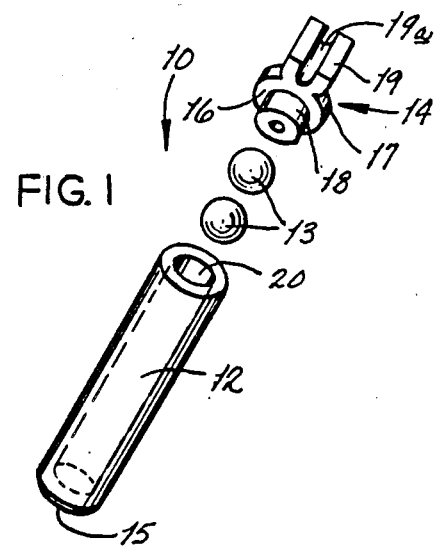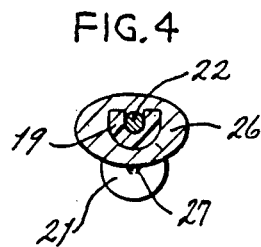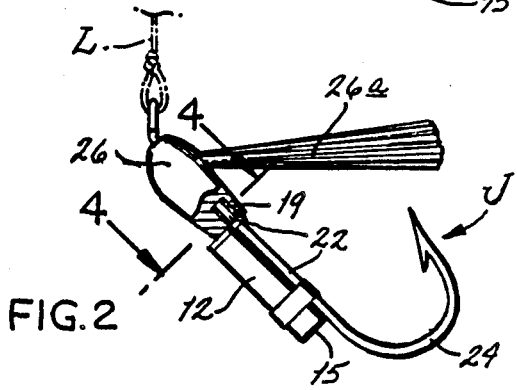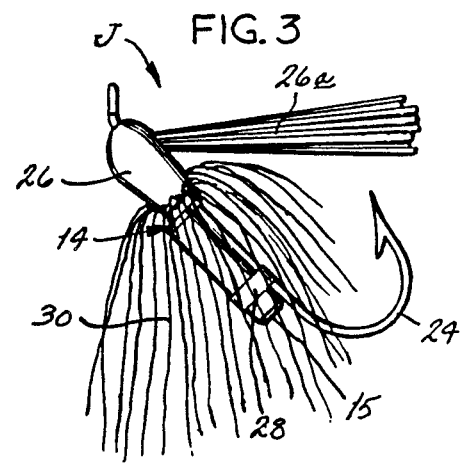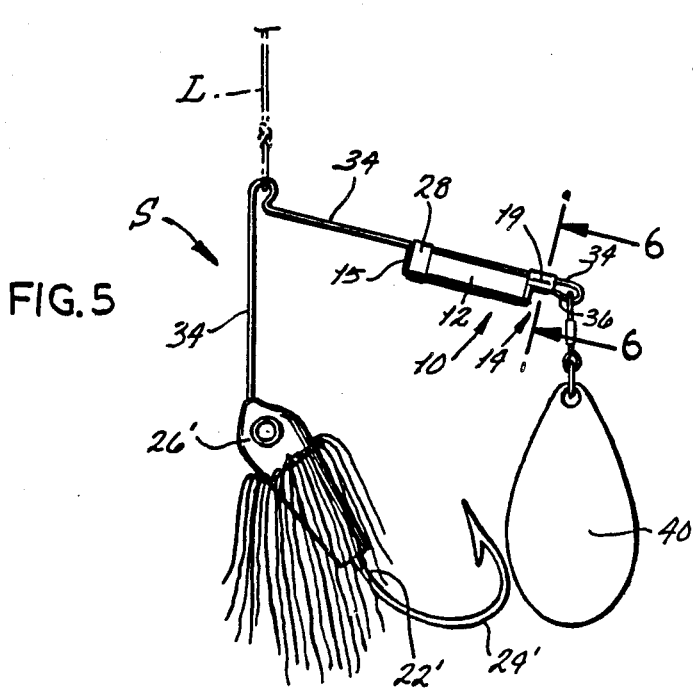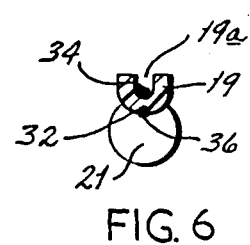

RATTLING FISHING LURE

BACKGROUND AND SUMMARY OF THE INVENTION

The present invention relates, in general, to fishing equipment, and more particularly to a novel rattling capsule for attachment to the exterior of a fishing lure for noise-making to attract fish by mimicking their prey.

Heretofore various rattling lure concepts have been known. For example, U.S. Pat. No. 3,802,115 to Auten et al discloses a glass capsule containing several metal balls; the capsule being buried within a plastic worm to create a noise-making lure from a silent lure. U.S. Pat. No. 3,935,660 to Plew shows a metal ball sealed within two metal cups to form a noise-making device for molding within a soft plastic lure, such as a worm, for attaching to the hook itself before being molded within a lead weight, or for attaching to a wire harness for selective placement on a fish line.

Another type of noise-making worm lure is shown in U.S. Pat. No. 3,831,307 to Pittman. Pittman teaches lure-exterior rattles tied to the lure tail and formed as an open sphere with a clacker or an enclosed bell form containing several hard balls for noise-making.

A rattle for use on a spinner-type lure is taught by U.S. Pat. No. 3,848,353 to McClellan. The McClellan rattle consists of hexagonal slugs or beads contained in a bullet or torus shaped capsule having a central tube for carriage on the spinner wire or attached line.

Other jig-type lures exist in which the rattle is entirely surrounded by the body of the lure itself. These include lures shown in U.S. Pat. No. 4,712,326 to Hoover et al, U.S. Pat. No. 4,747,228 to Giovengo and U.S. Pat. No. 4,791,750 to Gammill. The Hoover et al rattle is merely a cavity molded within the lead weight of the jig. The cavity contains one metal ball and is sealed by a cap retained on a shelf formed at the edge of the cavity. The Giovengo lure contains a capsule with ridged sides containing multiple steel balls, the entire rattle being covered by a rubber sock. Gammill teaches a lead weight having a molded cavity for containing an aluminum or steel cylinder holding metal balls, the molded cavity being plugged by a larger metal ball.

Various shortcomings exist with known noise-making fishing lures, and achieving the goal of sufficiently mimicking the sound made by fishes' prey is not a simple task. Often the manufacturing process is complicated or expensive or the noise produced is unsatisfactory. For example, the patents of Plew, Auten et al, Hoover et al, Gammill and Giovengo all illustrate noise-makers which are formed within the lure itself or surrounded by some material so that the rattle is muffled, producing unsatisfactory mimicking. By contrast, Pittman shows a rattle which is exterior of the lure, but requires relatively complex attachment and is subject to snagging and breakage. Likewise, the Plew rattle may be attached exterior to the lure body, but so doing requires that the hook be formed in an abnormal, off-set position or that the rattle be attached to a harness for tying to the fish line; both arrangements are somewhat bulky and subject the lure to a high risk of snagging. Other rattles, such as those illustrated in McClellan, and previously discussed, are very complex in their designs, complicating and increasing the cost of manufacture.

Accordingly, it is among the objects of this invention to provide a rattle for use with fishing lures that relatively realistically imitates the noise produced by certain fish prey, such as crayfish, and that the noise be loud enough for the target fish to hear. The subject lure should be relatively simple and inexpensive to produce and easy to use as well as being water-tight and streamlined to avoid snagging on underwater plants and other objects. The rattling lure of the present invention should further be formed so as to be easily decorated, at the manufacturer or user's option.

In furtherance of these objects, the invention is briefly, a fishing lure having a weight, a hook having a shank extending from the weight and a rattling device for attracting fish. The rattling device comprises an elongated capsule of synthetic resin material having at least one noise-maker therewithin. A capsule closure means maintains the noisemaker within the capsule and longitudinally secures the capsule to the lure. The outer surfaces of the capsule are exposed to water when the lure is immersed in water for transmitting noise from the noise-maker to the water for attracting fish.

Other objects and features will be in part apparent and in part pointed out hereinbelow.

BRIEF DESCRIPTION OF THE DRAWINGS

FIG. 1 is an exploded elevational view of a fishing lure rattle capsule, noisemakers and a cap therefor constructed in accordance with and embodying the present invention in an opened unattached position.

FIG. 2 is an elevational view in partial section of an undecorated jig-type lure and the attached capsule of FIG. 1.

FIG. 3 is an elevational view of a decorated form of the jig lure of FIG. 2.

FIG. 4 is an end view of the cap and transverse section of the cap-lure weight intersection taken on line 4—4 of FIG. 2.

FIG. 5 is an elevational view of a spinner-type lure and the attached capsule of FIG. 1.

FIG. 6 is a transverse sectional end view of the capsule cap taken on line 6—6 of FIG. 5.

DESCRIPTION OF THE PREFERRED EMBODIMENT

Referring now to the drawings, illustrated in FIG. 1 and generally designated 10 is the rattling device that embodies the present invention. Device 10 comprises an elongated capsule 12 and its cap 14, both preferably of synthetic resin material, although capsule 12 might conceivably be made of metal or glass. Device 10 is designed for attachment to a variety of types of fishing lures.

The exterior of capsule 12 is approximately 13/16 inch long, prior to attachment of cap 14. The interior length of capsule 12 is approximately ¾ inch. The length and diameter of capsule 12 are such that preferably two number 4 shot 13 are able to freely roll along the interior length of the capsule. Shot 13 are preferably lead, but possibly some other material such as steel. Cap 14 is preferably formed of one piece and carries along its circumference an outward flange 16 and has an inward extension 18 of smaller diameter spaced centrally from flange 16. Integral extension 18 is journaled within end opening 20 of capsule 12 to seal flange 16 tightly over capsule opening 20 permitting capsule 10 to be water-tight. An integral extension 19 protrudes perpendicular to the axis of cap 14 from along the outer surface edge 17 of cap flange 16. Extension 19 forms an elongated saddle shape around a groove longitudinally to wrap at least partially around the shank portion 22 of hook 24 of a jig-type fishing lure, generally designated J and illustrated in FIGS. 2 and 3.

A preferably lead weight 26 is poured and allowed to form in a mold retaining at one end feathers 26a and at the other end cap extension 19 seated on hook shank 22. After weight 26 solidifies, leaving shank loop 23 exposed for attaching to line L, capsule 12 carrying shot 13 is pressingly attached, as shown in FIG. 2 and further secured by a length of shrink wrap material 28 which is sealed around the hook-directed end of shank 22 and the closed hook-directed end 15 of capsule 12. Jig-type rattling lure J is then ready to use as shown in FIG. 2 or may be preferably be decorated as illustrated in FIG. 3. Conventional fishing lure decorations 30 may optionally be attached around shank 22 and extension 18 near the point where they intersect lead weight 26 for example, as by tying. In order that rattle 10 not interfere with the strike of the fish, the length of a conventional jig lead weight (not shown) has been reduced and the conventional hook (not shown) shank length increased.

Accordingly, the integrally formed extension protrudes from an outer extent of the cap in a direction away from the capsule, the lead of the weight receiving and moldably surrounding said extension with the main portion of the cap extending from weight along and proximate to the hook shank, providing a very advantageous, remarkably effective lure construction.

An alternative use of rattling device 10 is illustrated in FIG. 5, showing a spinner-type lure, generally designated S. For simplicity, like features are designated by like numerals. Capsule cap 14 also has formed along the top of extension 19 a thin groove 32 for fitting slidably along spinner wire 34 (as shown in FIG. 6). The tip 36 of spinner wire 34 is engageably secured in a detent mechanism comprising a small indentation 27 in the outer surface 21 of cap 14, at the base of extension 19, as shown in FIG. 4. Capsule 12 is further secured to lure S by a length of shrink wrap material 28 provided simultaneously around the closed end of capsule 12 and around spinner wire 34. Accordingly, with this arrangement, the vibration caused by rotation of the spinner blade 40, when lure S is immersed and moved through water on fishing line L, causes maximum vibration of rattle 10 which remains securely attached to spinner wire 34.

In both the jig-type and spinner type lure arrangements described above, the outer surfaces of rattling device 10 are exposed to the water when the lure is immersed therein. This direct exposure to the water facilitates transfer of a rattling noise to the water and thus to the target fish from device 10. Furthermore, the size and forms of device 10 and particular use of two number 4 lead shot provide an optimum rattling sound for the purpose of attracting fish.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A rattling device for attachment to a fishing lure, the rattling device comprising an elongated capsule of synthetic resin material, at least one noise-maker and capsule closure means for maintaining the noise-maker within the capsule, the closure means comprising a one-piece capsule cap receivable upon one end of the capsule, the capsule cap being provided with an integral extension protruding perpendicular to the longitudinal axis of the cap and adapted for longitudinal attachment to a fishing lure and defining a site for optional securement of decoration means.

2. A rattling device for attachment to a fishing lure according to claim 1, the capsule having an exterior length of approximately 13/16 inch prior to attachment of the cap and an interior length of approximately ¾ inch, the capped device carrying two number 4 lead shot; the capsule having a diameter large enough to allow free movement of the contained lead shot for optimum noise-making for attracting fish, the cap having the integral extension grooved on its outer surface, the extension being adapted for attachment to a fishing lure.

3. A fishing lure having a weight, a hook having a shank extending from the weight, and a rattling device for attracting fish, the rattling device comprising an elongated capsule of synthetic resin material, at least one noise-maker and a one-piece capsule closure means for maintaining said noise-maker within the capsule, the closure means longitudinally securing the capsule to the fishing lure, and provided with an integral extension protruding perpendicular to the longitudinal axis of the closure means, the exterior surfaces of the capsule being exposed to water when the lure is immersed in water for transmitting noise from the noise-maker to the water for attracting fish.

4. The fishing lure of claim 3, the capsule closure means constituting a capsule cap receivable upon one end of the capsule and defining at an intersection of the capsule cap and the weight a site for optional attachment of decoration means to the lure.

5. The fishing lure of claim 4, the weight being molded, the capsule cap being molded integrally with the weight.

6. The fishing lure of claim 5, the weight being of lead, the cap being of synthetic resin material and having the integrally formed extension protruding from an outer extent of the cap in a direction away from the capsule, the lead of the weight receiving and moldably surrounding said extension with a main portion of the cap extending from the weight along and proximate to the hook shank.

7. The fishing lure of claim 3, being of the jig type, the weight being of molded lead, the closure means comprising a capsule cap, the cap carrying the integral extension on the outer surface of the cap for securement within the lead weight during molding thereof, the hook having a shaft portion, the shaft being of sufficiently greater length relative to the capsule that the capsule, when attached to the shaft between the weight and the hook, does not interfere with the strike of a fish, the cap extension extending from the weight body to an extent for tied securement of decoration means to the lure.

8. The fishing lure of claim 3, the integral extension forming a longitudinal groove for slidably fitting along said hook shank portion.

9. The fishing lure of claim 3, further comprising a length of shrink wrap material secured around the hook shank at its hook end and around the capsule at its hook end, for further securing the capsule to the hook.

10. The fishing lure of claim 3, the noise-maker comprising at least one shot, for producing a rattling noise to attract fish.

11. The fishing lure of claim 10, the shot being of lead of the number 4 size.

12. The fishing lure of claim 3, being of the spinner type, having a spinner device attached by a wire to the weight and wherein the capsule closure means comprises a cap and the integral extension carried on the outer surface of the cap, said integral extension further comprising a longitudinal groove for slidably fitting along the spinner wire, the cap further comprising detent means on the outer portion of the cap for engageably securing the tip of the spinner wire for further securing the capsule to the lure.

13. The fishing lure of claim 12, further comprising a length of shrink wrap material secured around the spinner wire and around the capsule at its base end, for further securing the capsule to the lure.

14. A fishing lure having a weight, a hook having a shank extending from the weight and a rattling device for attracting fish, the rattling device comprising an elongated capsule of synthetic resin material, rattling noise-makers within the capsule, and a tight-fitting cap for maintaining the noise-makers within the capsule, the cap having means for longitudinal attachment of the cap and attached capsule to the fishing lure, securement means for attachment of the capsule to the hook shank, the lure being of the jig type, the weight being of molded lead, and the cap including an integral extension carried on the outer surface of the cap for securement within the lead weight during molding thereof, the shank being of sufficiently greater length relative to the capsule that the capsule, when attached to the shaft between the weight and the hook, does not interfere with the strike of a fish, the cap extension extending from the weight body to an extent for securement of decoration means, the cap extension further comprising a longitudinal groove for slidably fitting along said hook shaft portion, the securement means comprising a length of shrink wrap material extending around the hook shank at a hook-proximate portion and extending also around the capsule at its hook end, for further securing the capsule to the lure, the noise-makers comprising at least one shot, the exterior surfaces of the capsule being exposed to water when the lure is immersed in water for transmitting rattling noise from the noise-makers to the water for attracting fish.

15. A fishing lure having a weight, a hook and a wire extending from the weight and a rattling device for attracting fish, the rattling device comprising an elongated capsule of synthetic resin material, rattling noise-makers within the capsule and a tight-fitting cap for maintaining the noise-makers within the capsule; the cap having means for longitudinal attachment of the cap and attached capsule to the fishing lure, securement means for attachment of the capsule to the fishing lure wire; the lure being of the spinner type, having a spinner device attached by the wire to the weight, the capsule cap means including an integral extension carried on the outer surface of the cap, the extension comprising a longitudinal groove for slidably fitting along the spinner wire, the capsule cap comprising detent means on the outer portion of the cap for engageably securing the tip of the spinner wire, the securement means comprising a length of shrink wrap material extending around the spinner wire and extending also around the capsule at its hook end for further securing the capsule to the lure, the noise-makers comprising at least one shot, the exterior surfaces of the capsule being exposed to water when the lure is immersed in water for transmitting rattling noise from the noise-makers to the water for attracting fish.

16. A rattling device for attachment to a fishing lure, the rattling device comprising an elongated capsule, at least one noise-maker and capsule closure means for maintaining the noise-maker within the capsule, the closure means comprising a one-piece capsule cap receivable upon one end of the capsule, the capsule cap being provided with an integral extension protruding perpendicular to the longitudinal axis of the cap and adapted for longitudinal attachment to a fishing lure and defining a site for optional securement of decoration means.

17. A fishing lure having a weight, a hook having a shank extending from the weight, and a rattling device for attracting fish, the rattling device comprising an elongated capsule, at least one noise-maker and a one-piece capsule closure means for maintaining said noise-maker within the capsule, the closure means longitudinally securing the capsule to the fishing lure and provided with an integral extension protruding perpendicular to the longitudinal axis of the closure means, the exterior surfaces of the capsule being exposed to water when the lure is immersed in water for transmitting noise from the noise-maker to the water for attracting fish.

18. The fishing lure of claim 17, the capsule closure means constituting a capsule cap receivable upon one end of the capsule and defining at an intersection of the capsule cap and the weight a site for optional attachment of decoration means to the lure.

19. The fishing lure of claim 19, the weight being molded, the capsule cap being molded integrally with the weight.

20. The fishing lure of claim 19, the weight being of lead, the cap being of synthetic resin material and having the integrally formed extension protruding from an outer extent of the cap in a direction away from the capsule, the lead of the weight receiving and moldably surrounding said extension with a main portion of the cap extending from the weight along and proximate to the hook shank.

21. The fishing lure of claim 20, the capsule being formed of materials selected from the group consisting of synthetic resin material, glass and metal.

22. The fishing lure of claim 21, the noise-maker comprising at least one shot, for producing a rattling noise to attract fish by movement within the capsule.

23. A rattling device for attachment to a fishing lure, the rattling device comprising an elongated capsule of synthetic resin material, at least one noise-maker and capsule closure means for maintaining the noise-maker within the capsule, the closure means comprising a capsule cap receivable upon one end of the capsule, the capsule cap being adapted for longitudinal attachment to a fishing lure and defining a site for optional securement of decoration means, the capsule having an exterior length of approximately 13/16 inch prior to attachment of the cap and an interior length of approximately ¾ inch, the capped device carrying two number 4 lead shot; the capsule having a diameter large enough to allow free movement of the contained lead shot for optimum noise-making for attracting fish, the cap having an integral grooved extension on its outer surface, the extension being adapted for attachment to a fishing lure.

24. A fishing lure having a weight, a hook having a shank extending from the weight, and a rattling device for attracting fish, the rattling device comprising an elongated capsule of synthetic resin material, at least one noise-maker and capsule closure means for maintaining said noise-maker within the capsule, the closure means longitudinally securing the capsule to the fishing lure, the exterior surfaces of the capsule being exposed to water when the lure is immersed in water for transmitting noise from the noise-maker to the water for attracting fish, the fishing lure being of the jig type, the weight being of molded lead, the closure means comprising a capsule cap, the cap carrying an integral extension on the outer surface of the cap for molding within the lead weight, the hook having a shaft portion, the hook shaft and weight being of such relative length that the capsule, when attached to the shaft between the weight and the hook, does not interfere with the strike of a fish, the cap extension extending from the weight body to an extent for tied securement of decoration means to the lure.

25. A fishing lure having a weight, a hook having a shank extending from the weight, and a rattling device for attracting fish; the rattling device comprising an elongated capsule of synthetic resin material, at least one noise-maker and capsule closure means for maintaining said noise-maker within the capsule, the closure means longitudinally securing the capsule to the fishing lure, the exterior surfaces of the capsule being exposed to water when the lure is immersed in water for transmitting noise from the noise-maker to the water for attracting fish, the cap integral extension forming a longitudinal groove for slidably fitting along said hook shank portion.

26. A fishing lure having a weight, a hook having a shank extending from the weight, and a rattling device for attracting fish, the rattling device comprising an elongated capsule of synthetic resin material, at least one noise-maker and capsule closure means for maintaining said noise-maker within the capsule, the closure means longitudinally securing the capsule to the fishing lure, the exterior surfaces of the capsule being exposed to water when the lure is immersed in water for transmitting noise from the noise-maker to the water for attracting fish, the lure being of the spinner type, having a spinner device attached by a wire to the weight and the capsule closure means comprising a cap and an integral extension carried on the outer surface of the cap, the integral extension further comprising a longitudinal groove for slidably fitting along the spinner wire, the cap further comprising detent means on the outer portion of the cap for engageably securing the tip of the spinner wire for further securing the capsule to the lure.

27. A fishing lure having a weight, a hook having a shank extending from the weight, and a rattling device for attracting fish, the rattling device comprising an elongated capsule of synthetic resin material, at least one noise-maker within the capsule, the closure means longitudinally securing the capsule to the fishing lure, the exterior surfaces of the capsule being exposed to water when the lure is immersed in water for transmitting noise from the noise-maker to the water for attracting fish, the capsule closure mans constituting a capsule cap receivable upon one end of the capsule and defining at an intersection of the capsule cap and the weight a site for optional attachment of decoration means to the lure.

28. The fishing lure of claim 27, the weight being molded, the capsule cap being molded integrally with the weight.

29. The fishing lure of claim 28, the weight being of lead, the cap being of synthetic resin material and having an integrally formed extension protruding from an outer extent of the cap in a direction away from the capsule, the lead of the weight receiving and moldably surrounding the extension with a main portion of the cap extending from the weight along and proximate to the hook shank.

30. A fishing lure having a weight, a hook having a shank extending from the weight, and a rattling device for attracting fish, the rattling device comprising an elongated capsule, at least one noise-maker and capsule closure means for maintaining said noise-maker within the capsule, the closure means longitudinally securing the capsule to the fishing lure, the exterior surfaces of the capsule being exposed to water when the lure is immersed in water for transmitting noise from the noise-maker to the water for attracting fish, the weight being molded, the capsule being molded integrally with the weight.

31. The fishing lure of claim 30, the weight being of lead, the cap being of synthetic resin material and having an integrally formed extension protruding from an outer extent of the cap in a direction away from the capsule, the lead of the weight receiving and moldably surrounding the extension with a main portion of the cap extending from the weight along and proximate to the hook shank.

32. The fishing lure of claim 31, the capsule being formed of materials selected from the group consisting of synthetic resin material, glass and metal.

33. The fishing lure of claim 32, the noise-maker comprising at least one shot, for producing a rattling noise to attract fish by movement within the capsule.

* * * * *

UNITED STATES PATENT AND TRADEMARK OFFICE
CERTIFICATE OF CORRECTION

PATENT NO. : 5,001,856

DATED : March 26, 1991

INVENTOR(S) : Don Gentry

It is certified that error appears in the above-identified patent and that said Letters Patent is hereby corrected as shown below:

Col. 6, line 37, "19" (second occurrence) should be --18--;

Col. 8, line 7, after "noise-maker" and before "within" add --and capsule closure means for maintaining the noise-maker--.

Signed and Sealed this

Fourth Day of August, 1992

Attest:

DOUGLAS B. COMER

*Attesting Officer*  *Acting Commissioner of Patents and Trademarks*